Nov. 29, 1960   R. P. COLEMAN ET AL   2,962,243
GUST SENSING APPARATUS FOR AIRCRAFT
Filed May 7, 1956
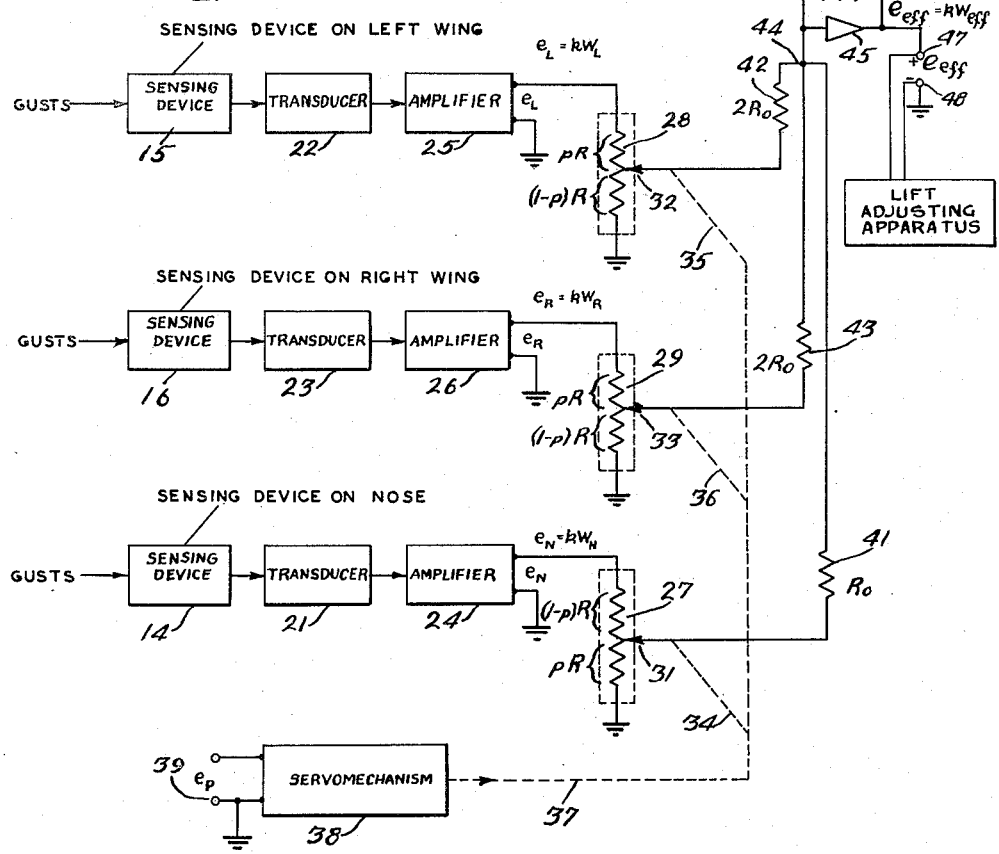
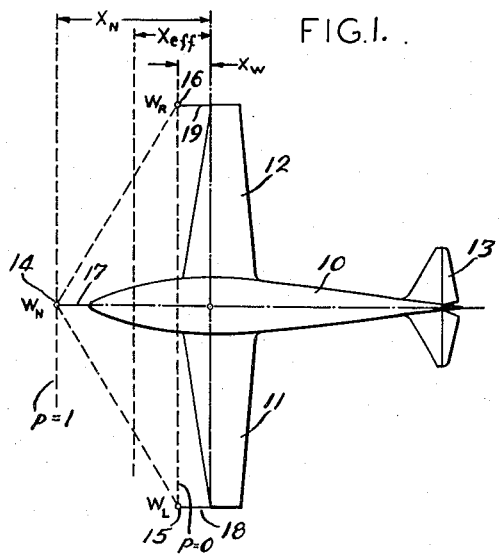
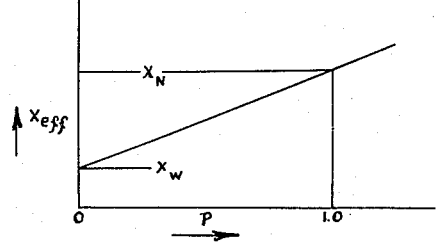
INVENTORS:
ROBERT P. COLEMAN
GILBERT S. STUBBS
BY Howson & Howson ATTYS.

2,962,243
GUST SENSING APPARATUS FOR AIRCRAFT

Robert P. Coleman, Bala-Cynwyd, and Gilbert S. Stubbs, Levittown, Pa., assignors to The Franklin Institute, Philadelphia, Pa., a corporation of Pennsylvania Filed May 7, 1956, Ser. No. 583,300

7 Claims. (Cl. 244—77)

This invention relates to a method of alleviating the effect of gusts on aircraft. More specifically, this invention relates to a method of alleviating the effect of gusts by pre-sensing the gust effects at one or more points in front of the gust-affected areas to obtain a signal and applying a combination of signals to operate aerodynamic-force-producing apparatus located in the gust-affected areas so as to produce forces which are equal and opposite to the gust-produced forces. This invention also applies to apparatus for practicing the method of the present invention.

In aviation parlance a "gust" is any sudden change in velocity (including direction) in the motion of the air. Gusts have a number of effects upon the surfaces of an aircraft. Probably the most important of these effects are changes in lift on the whole or any part of the aerodynamic surfaces so that the aircraft motion becomes unsteady. In addition, gusts may produce a variation in the stresses in the aircraft structure. The effect of gusts in changing the lift of the aerodynamic surfaces is important to the commercial aircraft industry from the standpoint of passenger comfort. The same effect is of importance to the military from the standpoint of steadiness of the aircraft as a platform for such precision tasks as mapping, bombing, and gun and rocket fire. The effect of variation of stresses in the aircraft structure has important implications in connection with structural design.

It would be possible to partially alleviate the effect of gusts simply by placing a pre-sensing element in advance of the nose of an aircraft and using the gust-produced signals obtained therefrom to adjust the force producing apparatus adjacent to the affected areas.

However, such a pre-sensing device would suffer from the difficulty that it would be unable to take into account gusts which affect one portion of the aircraft more than another. Another difficulty is that the pre-sensing distance required for proper timing of the sensing device signal with the gust effects varies with the airspeed, and in order to achieve proper timing either the presensing distance must be varied by changing the length of the probe on which the sensing device is mounted, or the effective pre-sensing distance must be varied by applying some means for delaying in time the sensing device signal by an amount dependent on airspeed.

The present invention corrects for differences in gust effects on different portions of the gust-affected areas by using a plurality of gust-detecting devices distributed spanwise in front of the various portions of the gust-affected area. Distribution may be lengthwise in the direction of flight as well as spanwise. The distribution makes it possible to obtain an average of all gust effects and to provide compensation in accordance with the average. This average is a weighted average taking into account the averages at each lengthwise position in the first instance and then averaging these averages in order to permit compensation for changes in speed.

An adjustment to compensate for changes in speed is accomplished in a somewhat different manner. An interpolation process is involved in the adjustment of the effective location of the gust-sensing positions or points. To this end, the gusts are detected at various lengthwise positions in advance of the gust-affected area and the proportions of the signal from the lengthwise positions are combined in adjustable interdependent ratios in order to shift or interpolate the effective location of the whole gust-sensing operation in advance of the gust-affected area. By an extension of the same technique, it is possible to extrapolate the gust-sensing beyond the gust-sensing point furtherest from the gust-affected area.

What is accomplished by the present invention is a spanwise averaging of gust effects in combination with a repositioning of the effective point of over-all gust pre-sensing to compensate for changes in aircraft speed. This combination produces an effect which is used to adjust the force producing apparatus, such as the lift adjusting apparatus associated with the wings of an aircraft in anticipation of gust effects, in order to compensate for and hence nullify the effects of the gusts. By adjusting the effective position of the gust detection, the anticipation can be properly timed so that the forces produced by the alleviating apparatus have the proper time-correspondence with the gust forces for each speed of the aircraft.

In accordance with the present invention, a method of alleviating the effects of gusts on aircraft having force producing apparatus associated with gust-affected areas is provided. In accordance with the method, gusts are detected at a number of points in advance of the leading edges of the gust-affected areas of the aircraft. A signal is produced in proportion to the momentary effect of gusts at each point of detection. A variable portion of each signal is selected, the portion depending upon the lengthwise position in the direction of flight at which the signal originates in order to effectively interpolate between the signals of different levels. The variable portions are combined in predetermined fixed proportions with the variable portions of the other signals. The combined signal is used to actuate the force producing apparatus in a manner which compensates for the gusts. In the meantime, the proportions of the respective signals are varied in accordance with the speed of the aircraft to vary by the interpolation process the effective distance ahead of the gust-affected area of the gust detection.

The present invention also contemplates a system for alleviating the effects of gusts, and specifically the effects of gusts on the wings of an aircraft having wings transverse to a fuselage and having lift-adjustment apparatus associated with the wings. The system consists of a plurality of gusts detectors supported on the aircraft in fixed positions in spanwise distribution and positioned in advance of the wings at different lengthwise positions in the direction of flight. Transducers are provided to convert signals proportional to the gust affect on each gust detector into a useful form. Thereafter, signal proportioning devices select a variable portion of each signal in accordance with the location relative to the gust-affected area of the particular detector involved. The variable portion is determined by an air-speed-responsive operator for adjusting the signal proportioning means. This adjustment is in the nature of interpolation and consequently has the effect of shifting the effective location of the gust detection to different lengthwise positions in advance of the wings. Signal-averaging means is provided to average the signals at each lengthwise position of detection and to average the average signals from the various lengthwise positions. Finally, means responsive to the combined average signal is employed to actuate the lift-adjusting apparatus to anticipate the gust detected.

The method of the present invention is intended to be broad enough to cover application of the invention to various gust-affected areas be they wings or other surfaces of an aircraft. For most practical purposes, the wings and the other lift-producing surfaces will be ones most seriously affected by gusts, and hence will be of primary interest in the gust-allegiation system. In order to provide satisfactory gust alleviation, it may be desirable to provide alleviation for the tail structure as well as for the wings. However, for the sake of simplicity in further discussions of the present application, reference will be made solely to the effect of gusts on wings and the alleviation of these effects, and it will be understood that corresponding means may be applied to other aerodynamic surfaces of an aircraft in essentially the same way.

An advantage of the present system, in addition to its inherent simplicity and its satisfactory performance, is the ability of the system to be applied to force producing apparatus which is already part of the aircraft. Thus, in the case of the wings, the direction changing apparatus is the lift-adjusting, or lift control, apparatus which may take various forms, such as controllable slots, flaps, spoilers, camber-changing devices and boundary layer control devices. In accordance with the present invention, any one or a combination of two or more of these lift devices may be employed to effect gust alleviation in a particular aircraft.

For a better understanding of the present invention, reference is made to the following drawings, in which Fig. 1 is a schematic representation of a typical aircraft illustrating how gust detectors may be applied to the nose and wing tips of the aircraft;

Fig. 2 is a schematic representation of one system which may be employed to perform the method of the present invention; and Fig. 3 illustrates graphically the change in the effective position of the gust detection in advance of the aircraft in response to changes in the portions of the signals selected from gust detection points at various lengthwise positions.

Referring to Fig. 1, the schematic plan view represents an aircraft having a fuselage 10 arranged in the general direction of flight and wings 11 and 12 arranged transverse to the fuselage, said wings being designed to provide aerodynamic lift for the aircraft. Also providing aerodynamic lift to the aircraft, is the tail assembly generally designated 13, but in the analysis and discussion which follows only the effect of gust upon the lift supplied by the wings of the aircraft will be considered, it being understood that alleviation of gust effects on other surfaces of the aircraft can be accomplished in an analogous manner.

As shown in Fig. 1, gust detector elements 14, 15 and 16 are supported on probes 17, 18 and 19, respectively, which are fixed, respectively, to the nose of fuselage 10 and to the left wing tip 11 and to the tip of the right wing 12. In each case, the detectors are arranged in advance of the wings in the direction of travel of the aircraft. Consequently, most gusts effecting the aircraft will be detected by the detectors before they reach the aerodynamic surfaces involved. Referring to Fig. 2, one system for alleviating gusts is illustrated.

Referring now to Fig. 2, one possible system employing the method of the present invention is shown schematically with boxes representing conventional circuitry or other system elements well known in the art. As illustrated in Fig. 1, the sensing devices or detectors are exposed in advance of the nose, the left wing and the right ring in order to pre-sense gusts which are schematically represented by arrows in Fig. 2 and which may be of any velocity including a variety of directions. Each of the detectors 14, 15 and 16 is coupled to its own transducer 21, 22 and 23, respectively, in order to convert the particular type of signal which the sensing device produces into a more useful type of signal. For example, if the detector or sensing device is a small model wing, the aerodynamic lift force on the model wing may be detected and transformed by a transducer into a potential or electrical voltage as illustrated here. On the other hand, it might be employed to change the energy into hydraulic pressure. Where the signal is transformed to electrical potential, an amplifier 24, 25, 26, may, in turn, be coupled to each of the transducers 21, 22, 23, respectively, in order to amplify each of the signals. The amplifiers are each grounded and each produces a voltage output signal above ground, which is represented as $e_N$, $e_L$ and $e_R$ (representative of the signal voltage from the nose, from the left wing and from the right wing, respectively). These signals are directly proportional to the effect of the wind on the detector or sensing device and preferably the systems are matched so that they treat similar gusts effects identically and produce signals which have the same proportionality constant which may be represented as $k$. Hence $e$ can be expressed as a product of a constant $k$ and the mechanical force of the gusts on the nose detector ($W_N$), on the left wing tip of the detector ($W_L$) and on the right wing tip of the detector ($W_R$), respectively. The signal is applied across a resistance to ground, in each case, the resistances being designated 27, 28 and 29, respectively. Each of these resistances is part of a potentiometer having an adjustable tap 31, 32 or 33 which permits its use as a voltage divider. Taps 31, 32 and 33 are movable by mechanical means 34, 35 and 36, schematically represented in Fig. 2 by dashed lines and these mechanical means may be suitably coupled together by means 37 to move in unison. The in unison response to a servo-mechanism 38 is possible in response to a signal voltage $e_p$ across the terminals 39, which voltage is proportional to the speed of the aircraft. It will be obvious that various types of driving mechanisms may be employed, including electrical or hydraulic types, but in each case the mechanism is preferably a servo-mechanism responding automatically to voltage changes. Although manual adjustment of the center taps in response to speed is at least theoretically possible, it is not preferred.

The adjustment of the taps of the potentiometers is effective to adjust the effective position of the over-all gust-sensing in advance of the gust-affected areas as will be further explained hereafter.

Connected to the center taps of each potentiometer voltage divider is a fixed resistance 41, 42 or 43 which is selected in relation to the other fixed resistances for the same purpose in order to produce an averaging effect. For example, in a system in which all signal production is balanced, the resistance 41 is half the size of the resistors 42 and 43 so that, if resistor 41 is $R_0$, resistors 42 and 43 are each $2R_0$. These resistances are connected together at a junction 44 to produce a combined signal proportional to the average gust effect pre-sensed at the particular effective distance ahead of the aircraft wings represented by the settings of the taps 31, 32 and 33. This combined signal is applied across a high-gain D.C. amplifier 45 which is by-passed by a resistor 46 having a resistance $R_0$, like resistor 41, so that the effective signal across the terminals 47—48 connected to the amplifier and to ground, respectively, is proportional to the over-all effective force of gusts on the wings of the aircraft at some time. Across the output terminals 47—48 is connected suitable drive means for adjusting the lift mechanism of the plane. The particular type of lift adjusting apparatus selected is a matter of choice but may include, for example, trailing-edge flaps for wings, mechanical spoilers, and air-jet spoilers. By adjusting the effective distance of gust detection in advance of the wings in accordance with the speed of the aircraft, it is possible in accordance with the normal time delay of the circuit and response of the elements to provide compensation just at the proper time to nullify the effects of gusts. The signal across terminals 47 and 48 is, consequently, applied to means for controlling the lift-changing apparatus in such a manner as to drive that apparatus in such a direction as to oppose the change in lift threatened by the gust effects. For example, a hydraulic servomechanism or other drive may be employed to change the adjustment of the lift-adjustment apparatus associated with the wings in response to this signal, the drive motor preferably being adapted to operate the lift-adjustment apparatus in the conventional manner.

It should be noted that additional input signals to the lift changing device are required to provide the proper control and stability to the alleviated airplane. These signals may be derived from the gust sensing devices, inertial devices (e.g., gyroscopes and accelerometers), and from the pilot's control system.

As previously pointed out, the system described accomplishes compensation for gust effects as the result of pre-sensing but does more than that by the dual effects of adjustment of the effective distance ahead of the aircraft of the pre-sensing and spanwise averaging of the gust effects. In the operation of any system in accordance with the method of the present invention, the gust effects are translated into some sort of signal which can be employed to accomplish the end of adjustment by passing through the detector to a suitable transducer and through an amplifier if necessary. Before the signals are combined, only a portion of each of them is selected for combination and the portion selected is variably dependent upon the desired effective position of the over-all gust-sensing effect because such variation is effective to change the effective distance ahead of the wings of the gust sensing. In the system described, this variation is accomplished through a change in voltage division. The potentiometers preferably all have the same total resistance here designated R, and, in the system shown in Fig. 2, the tap in each case divides the potentiometer resistance into two parts which may be represented by $pR$ and $(1-p)R$, respectively. The distribution and division in the case of the resistors 27, 28 and 29 is the same, but in the case of the resistor 27, the division is reversed, i.e. in the case of resistors 28, 29, the effective resistance between the tap and ground is $(1-p)R$ and in the case of resistance 27, the portion between the tap and ground is $pR$. Since $p$ represents the fraction of the distance from the wing detectors to the nose detectors at which the effective detection is located, by proper selection of the factor $p$, which is done by selection of the proper potentiometer position, the effective distance in advance of the wings of the gust sensing can be adjusted by adjusting the tap of the potentiometer. Thus it will be understood that $p$ is a variable the selection of which determines the effective distance in front of the gust affected areas at which gusts are sensed. The potentiometer, or corresponding adjustable components for selection of the effective distance in front of the gust affected areas at which gusts are detected, therefore in any given system each have specific settings for different values of $p$, and may be calibrated in terms of the value of $p$ and hence in terms of said effective distance due to the interrelationship of these quantities. Fig. 3 illustrates this correlation of absolute distance from the gust affected areas to effective distance between sensing means and this term $p$, and this may normally be thought of as a linear relationship. The calibration of the potentiometers in terms of $p$, on the other hand, may not be linearly graduated, although in the discussion of this invention it has been assumed to be linear. This is illustrated in the graph shown in Fig. 3. Where X generally represents distance in advance of the lift effective portion of the wings, then $X_{eff}$ is the effective distance in advance of the wings of the over-all gust sensing. $X_w$ represents a fixed distance in advance of the wings at which the wing detectors are located (both preferably at the same distance) and $X_N$ represents the fixed distance in advance of the wings at which the nose detector is located. It will be seen from Fig. 3 that by variation of $p$ the effective distance from the wings may be varied by a process of interpolation. Thus the positions of the taps on the various potentiometers are interdendent, and since the required movement is linear they can easily be coupled together, to be driven by the same speed responsive servo-mechanism. The faster the speed of the aircraft the further ahead of the wings must be the effective position of the sensing elements. It will be seen from Fig. 3 that it is actually possible to project the effective position of sensing of the gusts in advance of the sensing element on the nose using an extrapolation principle, but it will be appreciated that the further the extrapolation is carried the less accurate the results become on a probability basis.

If the resistances 41, 42 and 43 were all the same size, a simple averaging of the signals obtained from the selected portion of the signals $e_N$, $e_L$ and $e_R$ would occur. However, in order to make the variable aspect of the pre-sensing effective, it is necessary to use a weighted average instead of a direct average. The weighted average is accomplished, in effect, by averaging together the effects of all gust-sensing devices on each level, and, in turn, averaging directly without additional weighting the average signals from all lengthwise positions. Thus in the case described the average gust effect at wing tip lengthwise position is averaged with the gust effect at the nose. In terms of the gust effects, this can be expressed by the following formula:

$$W_{eff} = \left(\frac{W_L + W_R}{2}\right)(1-p) + W_N p$$

where $W_{eff}$ is the effective gust effect, $W_L$ is the effect at the left wing tip device, $W_R$ is the effect at the right wing tip device, $W_N$ is the effect at the nose device. The effective distance of the gust sensing ahead of the wings can be expressed $X_{eff} = X_N p + X_w (1-p)$, where the distances are as previously expressed in connection with Fig. 3. It will be recognized that this formula expresses an interpolation process. Thus, for example, if $p$ is taken as one-half, then $(1-p)$ is also equal to one-half, then $$X_{eff} = \frac{X_w + X_N}{2}$$

An extrapolation effect can be had if $p$ is greater than 1. For example, if $p$ is equal to 1.1, then $(1-p)$ is equal to $-0.1$, and $$X_{eff} = 1.1 X_N - 0.1 X_w$$

or $$X_{eff} = X_N + 0.1(X_N - X_w)$$

While the effect upon wings of a particular aircraft have been described in a simple system, it will be appreciated that in a more complex system, a similar pre-sensing may be applied to the tail assembly. The same pre-sensing elements might be used for the tail, but it would be preferred to employ a separate pre-sensing system for the tail, since such a distance between sensing element and affected area might permit the introduction of additional gust effects before gusts sensed reached the tail.

Only one possible system for application of the method of the present invention has been described in some detail. Many other modifications are possible. For example, it would be possible to have additional gust-sensing devices or detectors in advance of the wings in different spanwise locations. It might even be possible to have more than one nose detector, particularly in a twin fuselage aircraft. In some cases, it might be desirable to apply sensing at three or more lengthwise positions instead of the two described. In some cases, the lengthwise positions in advance of the lift producing surfaces would not be determined by the relative lengthwise positions along the fuselage in the direction of travel. In fact, it might be difficult to predict where the lengthwise positions would actually lie, so that it might even be necessary to determine by experimentation where probes should be put in order to be treated as at the same lengthwise position for spanwise averaging purposes. It will be obvious to those skilled in the art that the modifications suggested and many others are possible within the scope of the claims. All such modifications within the scope of the claims are intended to be within the scope and spirit of the present invention.

We claim:

1. A system for the alleviation of the effects of gusts on wings of an aircraft having wings transverse to a fuselage and lift adjusting apparatus associated with the wings comprising a plurality of gust detectors supported on the aircraft in fixed poistion and spanwise distribution and positioned in advance of the wings at different lengthwise positions in the direction of flight, a transducer coupled to each detector to produce signals proportional to the gust effect on each detector, signal proportioning devices for selecting a variable portion of each signal, a speed responsive operator cooperating with the signal proportioning device for adjusting the signal proportioning devices in accordance with the speed to shift the effective location of gust detection to different lengthwise positions in advance of the wings, signal averaging means adapted to receive from the signal proportioning means the operator selected proportions of the signals at each lengthwise position of detection and to average the signals from the various lengthwise positions and means responsive to the combined average signal from the signal averaging means to actuate the lift adjusting apparatus to anticipate the gusts detected.

2. The system of claim 1 in which the detectors are supported at two lengthwise positions, one in advance of the wings and one in advance of the nose.

3. The system of claim 2 in which the transducer converts gust produced signals to electrical voltages, the signal proportioning devices are potentiometers arranged as voltage dividers and the signal averaging means are resistances of a size to produce a weighted average.

4. The system of claim 3 in which the speed responsive servo mechanism is employed to adjust the taps of the potentiometers to vary the voltage division in a manner which effectively produces interpolation between signals at different lengthwise positions.

5. The system of claim 4 in which only three detectors are employed one at each wing tip and one at the nose of the fuselage.

6. The system of claim 5 in which the potentiometers vary the proportions of signals detected and the averaging resistance accomplish averaging in accordance with the following formula:

$$W_{eff} = W_N p + \frac{W_L + W_R}{2}(1-p)$$

where $W_{eff}$ = the effective signal
$W_N$ = the total signal at the nose
$W_L$ = the total signal at the left wing tip
$W_R$ = the total signal at the right wing tip
$p$ = the fraction of the total distance from the wing tip detection lengthwise position to the nose detection lengthwise position at which the total effective signal is located.

7. Apparatus for alleviating the effect of gusts on aircraft having lift adjusting apparatus associated with gust affected areas comprising means for detecting gusts at a number of points at a plurality of lengthwise positions in the direction of flight and in a spanwise distribution in advance of the gust affected areas of the aircraft, means coupled to the gust detecting means for producing a signal proportional to the effect of the gusts at each point of detection, means for selecting from the signal producing means a variable portion of each signal such that the portion of the signal selected at all points at a given lengthwise position in the direction of flight are essentially the same, means coupled to the selecting means for combining in fixed predetermined proportion the variable portion of each signal, means at the output of the combining means using the combined signal at the output of the combining means to actuate the lift adjusting apparatus in a manner which compensates for the gusts, and means acting upon the means selecting a variable portion of the signal to vary the proportions of the respective signals in accordance with the speed of the aircraft to vary the effective distance ahead of the gust affected areas of the gust detection.

References Cited in the file of this patent

UNITED STATES PATENTS 2,621,873    Gordon _____ Dec. 16, 1952

OTHER REFERENCES

Mynall: "Electronic Engineering," June, 1947 (pages 178–180 relied on).

Mynall: "Electronic Engineering," July, 1947 (pages 214–217 relied on).